Figure 2:
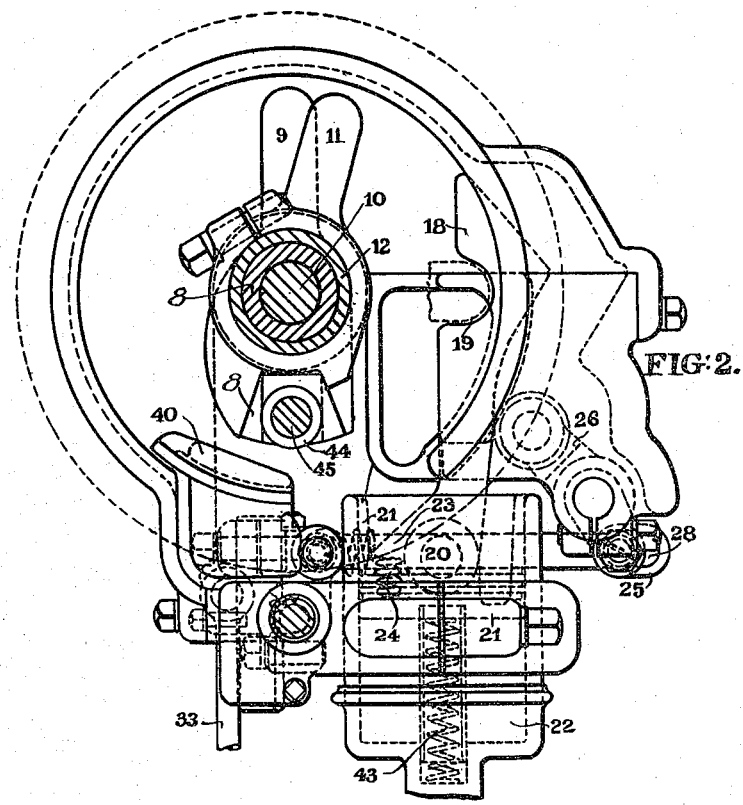

M. T. DENNE.
DRIVING AND STOPPING DEVICE FOR HIGH SPEED MACHINES.
APPLICATION FILED JUNE 7, 1912.
1,176,742.
Patented Mar. 28, 1916.
2 SHEETS—SHEET 1.
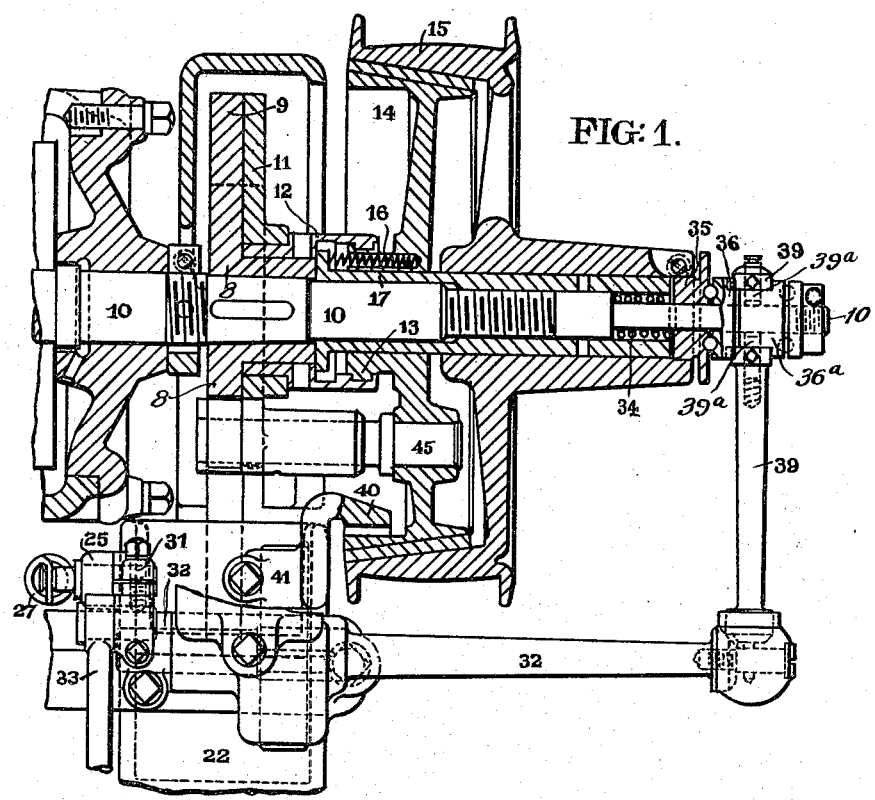
FIG. 1.
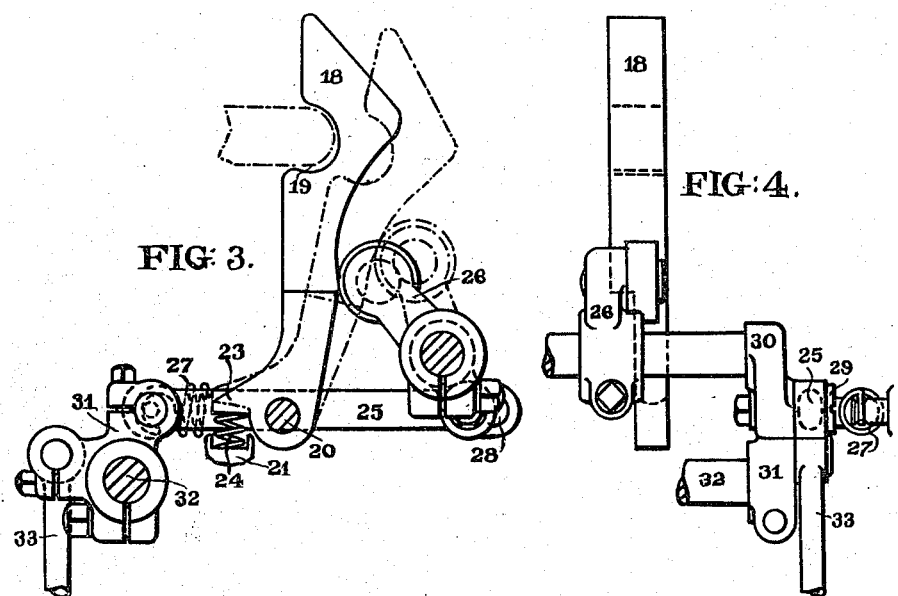
FIG. 3.
FIG. 4.

M. T. DENNE.
DRIVING AND STOPPING DEVICE FOR HIGH SPEED MACHINES.
APPLICATION FILED JUNE 7, 1912.

1,176,742.

Patented Mar. 28, 1916.
2 SHEETS—SHEET 2.

UNITED STATES PATENT OFFICE.

MARK THOMAS DENNE, OF RUSHDEN, ENGLAND.

DRIVING AND STOPPING DEVICE FOR HIGH-SPEED MACHINES.

1,176,742.                 Specification of Letters Patent.     Patented Mar. 28, 1916.

Application filed June 7, 1912.   Serial No. 702,177.

*To all whom it may concern:*

Be it known that I, MARK THOMAS DENNE, a subject of the King of Great Britain and Ireland, residing at Rushden, Northamptonshire, England, have invented new and useful Improvements in Driving and Stopping Devices for High-Speed Machines, of which the following is a specification.

This invention has reference to an improved driving and speed regulating mechanism especially intended for use on high speed machines, for example sewing machines, boot and shoe nailing machines and such other high speed machines which are employed on work of such a character that while portions of the work may be done at the highest speed, at which the machine is designed to run, other parts or portions of the work, owing to peculiarities of shape or for some other reason cannot well be done at such a speed if a very high standard of quality of the work done is to be maintained throughout.

A very large proportion of the work of which portions may be done with the machine running at its highest speed whereas other portions or parts should be done at a slower speed—having regard to the maintenance of the high standard of quality throughout—is of such a character that the initial and end portions of the work are so comparatively plain or straight that they may be done at the highest speed whereas the part or some parts intermediate of these is or are of such more complex shape that it or they must be done at a slower speed to enable the operator to properly adjust and generally manipulate the work during the operation of the machine that the high standard of quality of the work turned out shall be maintained throughout.

It is well known that friction driving gears whereby different speeds of movement are attained have been in use for many years, but my invention differs essentially from these.

Prior to my invention the friction gears have been of a character that the first portion of movement of a part—very usually a treadle—puts the friction device (usually cone clutches or friction disks) into comparatively slight frictional engagement thereby driving the machine at a slow speed and the further depression of the treadle increases the frictional engagement thereby increasing the speed of the machine until the treadle or equivalent has been moved to its full extent when the frictional engagement is such that the machine will run at the highest speed for which it is designed. A careful consideration of this will make it evident however that such a kind of friction driving gear is not really suitable when work of the character referred to is to be done that is work the initial and end portions of which can properly be done at the highest speeds and in which the intermediate portion requires a slowing down because with such known friction gears it is only after the treadle has been fully depressed that the highest speed is attained and although it may be said that the operator need merely depress the treadle rapidly to attain an almost instantaneous quick drive yet in practice this is not quite so easy as in doing large quantities of work the labor involved in repeatedly fully and rapidly depressing a treadle is so very considerable that after a comparatively short time the operator becomes fatigued with the result that the machine will not be worked to its full capacity and frequently also with the result that the quality of the work suffers. Similarly, when the end portion of the work is reached the operator must suddenly release the treadle to obtain as quick a stopping as is possible in the circumstances, but the treadle will not move very rapidly because to employ a strong spring whereby this might be effected would and very considerably to the labor reqired to depress it. Particularly does this become evident when very large quantities of the same work have to be done on the machine and the saving of even a very small period of time on each individual piece of work will amount to an appreciable saving when large quantities or numbers are to be done and the saving of labor to the operator on each piece of work also means an increased output on the machine and probably also a higher standard of quality of work.

One object of my invention is to provide a driving and speed regulating mechanism which will enable work of the character referred to to be turned out at the maximum speed and of a uniformly high standard of quality and without necessitating the expenditure of so much labor on the part of the operator as has heretofore been necessary.

To this end my invention comprehends an improved driving gear in which the first portion of the complete movement (which portion may be a very slight movement) of a treadle or equivalent will practically instantly cause the machine to run at its maximum speed whereas the further movement of the said treadle or equivalent will cause a gradual reduction in the speed—the reduction being proportional (substantially) to the extent of such further movement—until, when the treadle or equivalent has been moved to its full extent the machine may actually be brought to a stop. It will thus be seen that my improved frictional driving and speed regulating gear operates in the reverse order as compared with those already known in which latter the gradual movement of a treadle or equivalent from its initial position starts the machine at its lowest speed and thereafter brings about a gradual increase in the speed of the machine until when said treadle or equivalent has been moved to its full extent the machine will be made to run at its maximum speed.

My invention also comprehends the employment of improved mechanism for effecting the aforesaid ends or objects, the said means comprising *inter alia* a friction clutch consisting of two members each of which is movable relatively to the other and one of which is moved in order to drive the machine at its highest speed and the other of which may thereafter be moved to reduce the speed of the machine.

In combination with the aforesaid friction clutch my invention also comprehends mechanism controlled by a treadle or equivalent whereby a partial movement to a predetermined extent of said treadle or equivalent from its initial position will move or cause to be moved one member of the friction clutch to engage the other member and a further movement in the same direction of the treadle or equivalent will move or cause to be moved the second member of the friction clutch to a greater or less extent away from the first to thereby decrease to a greater or less extent the speed of the machine.

While I wish it to be clearly understood that I do not confine or restrict myself to the particular mechanism hereinafter described whereby to attain the objects of my invention as already set forth, I propose to describe what I consider to be the most simple and in every way the best mechanism for attaining the several purposes in view. This mechanism is illustrated in the accompanying drawings, in which:—

Figures 5, 6:
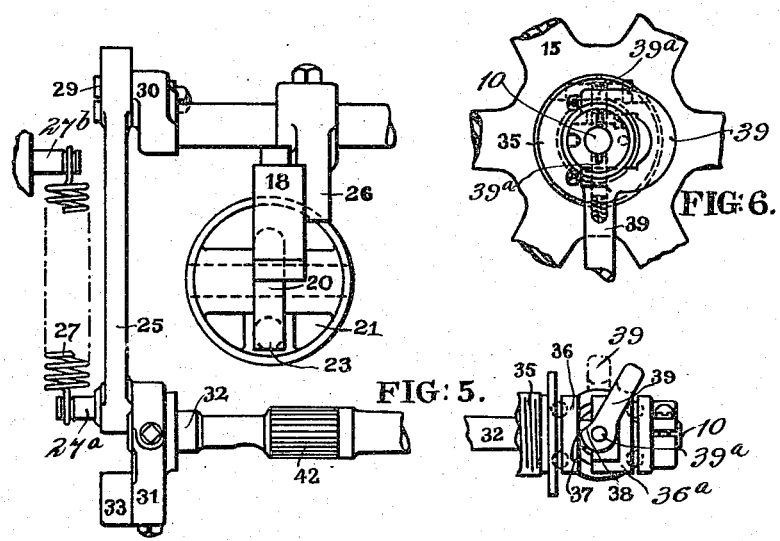

Figure 1 is a longitudinal section, and Fig. 2 an end view, partly in section, of the complete device; Fig. 3 shows the controlling mechanism separately, as seen from the side, and Fig. 4 of the same mechanism as seen from the rear; Fig. 5 is a plan view of the parts shown in Figs. 3 and 4, and Fig. 6 is an end view of a detail to be referred to.

Referring to the drawings, 8 indicates an operating member mounted to rotate with a shaft or driven member 10, and provided with a radial arm 9. Rotatably mounted upon the member 8 is a second arm 11 which is movable to a slight extent relatively to the first arm so that said arms may be either in alinement with each other or at an angle (as shown in Fig. 2). The boss of the second arm engages or embraces a nut 12 having threads of high pitch which engage the correspondingly threaded boss 13 of the male member 14 of a cone friction clutch the arrangement being such that when the two arms referred to are moved so as to be in alinement the nut 12 will have acted to withdraw the male member 14 of the friction clutch away from the female member 15 said member being the driving member of the mechanism; but if the said arms be angular to each other, as shown in Fig. 2, the nut will have pressed the male member into tight contact with the female member.

For the purpose of imparting rotary movement to the nut 12 to thereby place the arms angular to each other and also to cause the male member 14 of the clutch to frictionally engage the female member 15 I provide one or more springs 16 one end of each of which presses against the web or boss of the male clutch member and the other end against a collar or annulus on the shaft or sleeve 17 on which said member is carried.

At a suitable position and normally held by preferably spring-pressed means in the path of movement or rotation of the arms 9, 11, but capable of being withdrawn from said path by means under the control of the operator I mount a piston rod 18 formed or provided with a notch or recess 19 which piston rod is pivotally connected at 20 to the piston 21 of an air cushion or cylinder 22 and preferably between a lug 23 on said piston rod and the piston I provide a spring 24 which tends to turn or move the piston rod 18 on its pivot 20 in a direction out of the path of rotation of the arms 9, 11, which if effected will release the said arms and permit the one to move into a position angular to the other and thereby practically instantly couple the male member 14 of the clutch to the female member 15.

The piston rod 18 is normally maintained in the path of the arms 9, 11, by a rod 25 which, acted on by a spring 27, acts to press the roll carrying end of a lever 26 against the back of said piston rod 18, the pressure being such as to overcome the pressure of the spring 24 above referred to and which tends to move the piston rod out of said path. The rod 25 is formed with a slot 28 with which a pin 29 on said lever (or on a lever or crank arm 30 in connection therewith) engages and the other end of said rod is pivotally connected to one arm of a bell crank lever 31 mounted on a rock shaft 32 to be described while the other arm of said bell crank lever is pivotally connected to a rod 33 which in turn is connected to a treadle lever or other equivalent (not shown) the spring 27 acting on the rod 25 serving to normally maintain the treadle in its raised position. As shown in Fig. 5 the spring 27 is connected on the one hand to a stud 27ᵃ projecting from the rod 25 and on the other hand to a stud 27ᵇ projecting from the frame of the machine. By depressing the treadle to a partial extent the rod 25 will be moved to the left (Fig. 3) thus removing its pressure against the pin 29 of the lever 26 or 30 whereupon the spring 24 will be made operative to swing the piston 18 back so that its notch 19 will be disengaged from the parts 9, 11, causing the part 11 to instantly advance and thereby coupling the clutch members to their full extent. The machine will then be driven at its highest speed.

The male member 14 of the friction clutch, which derives its rotary motion from the female member 15 (the latter serving as a driving pulley), is provided with a crank pin 45 whereby its rotary motion is imparted to the member 8 (the opposite end of said crank pin fitting in a block 44 carried by the member 8) and through the latter to the cam shaft 10. If therefore the treadle be partly depressed the male clutch member will be practically instantly caused to firmly engage with the rotating female member and the machine will be run at its full speed. It is here to be observed that the aforesaid partial depression of the treadle merely removes the obstruction which otherwise prevents the engagement of the two clutch members and the force of engagement of the said two members is not dependent upon the force applied by the operator in depressing the treadle but depends upon the strength or tension of the springs described whereby relative movement is imparted to the nut and the screw threaded boss of the male member. A very light pressure by the operator on the treadle may therefore be made to be sufficient to bring about the fullest engagement of the two clutch members. For the purpose of reducing the speed of the machine the female clutch member 15 is to be moved away from the male member 14 the latter being prevented from following up the female member by reason of its engagement with nut 12.

The following means may be provided to withdraw the female clutch member from the male member:—Around one end of the cam shaft 10 (which is for this purpose reduced in diameter) I mount a spring 34 which acting on a nut 35 attached to the boss of the female member tends to withdraw the latter from the male clutch member. Mounted on the cam shaft and having a ball race between it and the outer face of the nut 35 I provide a collar or equivalent 36 having cam surfaces 37 preferably two on its outer face which are intended at the proper times to be engaged by corresponding cam surfaces 38 formed on bosses formed on a vertical rock shaft 39 which is cranked at its upper end (see Fig. 6) and oscillates on studs 39ᵃ mounted centrally in the bosses and rotatably engaged in bearings in a collar 36ᵃ against which the collar 36 abuts when it is allowed to move to the right. The said rock shaft 39 is geared to or otherwise engaged at its lower end by the free end of the rock shaft 32 on the other end of which the bell crank lever 31 hereinbefore referred to is mounted the arrangement being such that when the treadle is depressed beyond a certain distance the cams 38, 37, will be moved relatively to each other to thereby permit the spring 34 on the cam shaft to move the female clutch member away from the male member thereby bringing about a reduction in the speed of the machine and if the treadle be depressed to its full extent the two clutch members will be completely separated and the machine will come to a stop. In order that the machine may be brought to a stop instantly after the two clutch members have been separated by the depression of the treadle to its full extent I provide a brake 40 which is made to act on the inside rim of the male clutch member 14 at that time, the brake shoe being carried on a vertically slidable rack the teeth of which are engaged by a toothed pinion or equivalent 42 on the bell crank carrying rock shaft 32. When the treadle is raised slowly the brake will be removed and the clutch members gradually engaged with increasing force according to the distance the treadle is raised until eventually the full speed of the machine is attained. If the treadle be then released the female clutch member 15 will remain in its position laterally and simultaneously the notched piston rod 18 will be moved into the path of movement of the two arms 9, 11, the first or advanced one 11 of which by engaging in the notch will be held thereby causing the nut 12 to effect the practically instantaneous withdrawal of the male clutch member from the other and when the other arm 9 engages the piston rod 18 the machine will be practically instantly stopped the shock brought about by the sudden engagement being absorbed by the air cushion 22 the piston rod 19 forcing the piston 21 to some extent into the air containing cylinder. The rebound of the piston (owing to the action of the compressed air in the cylinder and which may be assisted by a spring 43) may be made use of to remove the loop from the needle barb when my invention is applied to sewing machines.

The operation of the device is as follows:—The depression of the treadle brings about during the first portion of its stroke the withdrawal of the piston rod 18 from the path of the arms 9 and 11, with the result that the clutch is practically instantly fully engaged by the action of the springs 16 and full speed is imparted to the machine in less than one revolution, and further depression of the treadle results in a gradual reduction of the speed to any desired extent owing to the gradual withdrawal of the clutch member 15 from the member 14. If desired the reduction of speed may be continued until the brake 40 comes into action and stops the machine, but in practice this is unusual, the machine being usually driven continuously from start to finish of the operation in hand—for example in sewing or inserting a row of nails around a shoe. When the treadle is allowed to rise again, the speed is accelerated until full speed is again attained and at the desired moment the treadle is released and the machine is practically instantly stopped by the piston rod 18 being swung into the path of the arms 9 and 11.

What I claim as my invention and desire to secure by Letters Patent is:—

1. A driving and speed regulating mechanism comprising a driving member which is normally held in its operative position against the action of a spring by means under the control of the operator, a driven member which is normally held out of engagement with the said driving member against the action of a spring by means likewise under the control of the operator, and a single actuating member for controlling both of said means.

2. A driving and speed regulating mechanism comprising a driving member which is normally held in its operative position against the action of a spring by means under the control of the operator, a driven member which is normally held out of engagement with the said driving member against the action of a spring by means likewise under the control of the operator, and a single actuating lever and means operated by said lever when moved a predetermined distance to release the last mentioned means to permit engagement of the driving and driven members, and means also controlled by said lever for allowing the spring acting upon the driving member to move it to partially disengage the same from the driven member.

3. A driving, speed-regulating and stopping mechanism for high-speed machines comprising a driving clutch member mounted rotatably and slidably on the shaft to be driven, a spring acting upon the said member and tending to move it laterally out of its normal operative position, means under the control of the operator for holding the said member in operative position against the action of the said spring, a driven clutch member mounted slidably on the shaft and coupled to an operating member fixed on said shaft to rotate therewith, a spring or springs whereby the said driven member is normally pressed into engagement with the driving clutch member, an arm projecting radially from the said operating member, a second arm rotatably mounted on a boss of the said disk in such a manner that the latter arm is movable into alinement with the former or into a position at an angle thereto and in advance thereof, coupling means whereby the said latter arm controls the position of the driven clutch member relatively to the driving clutch member, a piston rod pivotally connected to an elastically pressed piston and normally held in the path of rotation of the aforesaid arms, and means under the control of the operator for withdrawing the said piston rod from the said path.

In testimony whereof I have signed my name to this specification in the presence of two subscribing witnesses.

MARK THOMAS DENNE.

Witnesses:
WALTER W. BALL,
F. HOOD.

Copies of this patent may be obtained for five cents each, by addressing the "Commissioner of Patents, Washington, D. C."